UNITED STATES PATENT OFFICE.

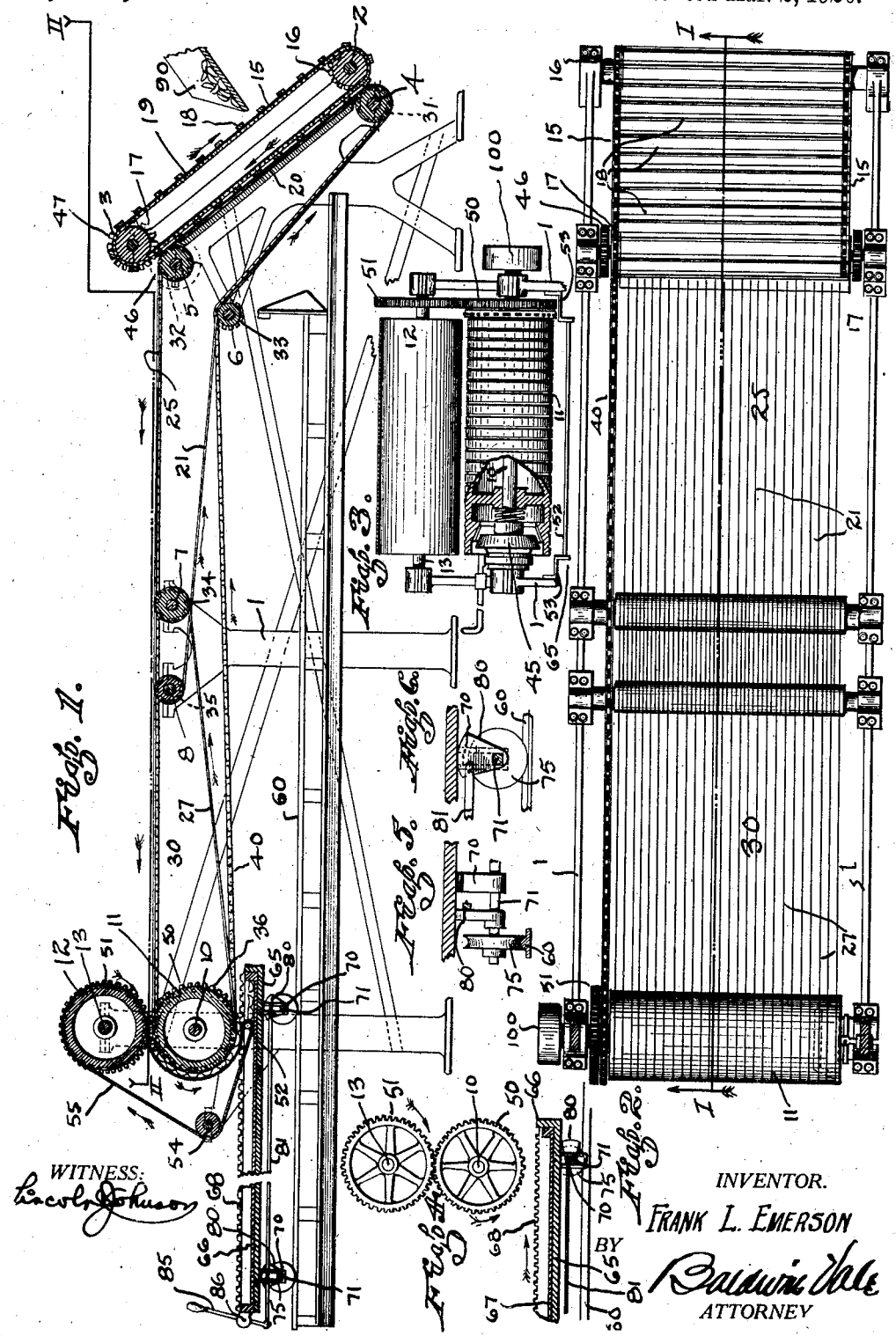

FRANK L. EMERSON, OF MOUNTAIN VIEW, CALIFORNIA.

MACHINE FOR SPREADING FRUIT.

1,332,866.         Specification of Letters Patent.       Patented Mar. 2, 1920.

Application filed June 18, 1917. Serial No. 175,379.

*To all whom it may concern:*

Be it known that I, FRANK L. EMERSON, a citizen of the United States, and a resident of Mountain View, county of Santa Clara, and State of California, have made a new and useful invention—to wit, Machine for Spreading Fruit; and I do hereby declare the following to be a full, clear, concise, and exact description of the same.

This invention is a machine for spreading out fruit, such as sliced apricots and the like, to be dried.

In this specification and the annexed drawing I disclose my invention in the form which I consider the best, but I do not limit my invention to such form as it may be embodied in other forms, and it is to be understood that in and by the claims following the description herein I intend to cover the invention in whatever form it may be embodied.

Referring to the annexed drawing:

Figure 1 is a vertical longitudinal section of my invention taken on line 1—1 of Fig. 2.

Fig. 2 is a plan of the invention taken on line 2—2 of Fig. 1.

Fig. 3 is a view of the draper and conveyer drums and their operating mechanism.

Fig. 4 is a view of the drum and truck operating gearing, the truck being lowered and its rack out of mesh with the lower drum gear.

Fig. 5 is a fragmentary sectional view of the fruit truck illustrating the wheel mounting of the truck.

Fig. 6 is a side view of the wheel mount shown in Fig. 5.

In the drawing 1 indicates the frame of the machine. Rollers 2, 3, 4, 5, 6, 7 and 8 extend transversely of and are journaled in the frame 1. A shaft 10 extends transversely of and is suitably journaled in said frame and a draper drum 11 is turnably mounted on said shaft. A conveyer drum 12 is mounted on a shaft 13, directly above the draper drum, which shaft is suitably journaled in the frame 1. A pair of chains 15 work over sprockets 16 and 17 on the ends of rollers 2 and 3 respectively, on the outside of which chains are secured slats 18 extending transversely of the frame 1 and spaced at suitable distances apart. The rollers 2 and 3 chains 15, sprockets 16 and 17 and slats 18 form an open-slotted draper 19. The roller 2 is journaled above and in advance of roller 3, giving the draper an upward inclination, from the roller 2 to the roller 3. The rollers 4 and 5 are journaled respectively below and in advance of rollers 2 and 3. An inclined wall 20 is mounted on the frame 1 between the rollers 4 and 5, which wall and rollers rest adjacent the lower reach of the draper 19. An endless draper belt comprising a plurality of suitably spaced wires 21 extends over the rollers 4, 5, 6, 7 and 8 forming a draper 25; said rollers being properly grooved to receive the wires 26 with their upper surfaces flush with the surface of the rollers. An endless draper belt comprising a plurality of wires 27, extends around roller 7, and drum 11, and over and under roller 8, forming a draper 30; said rollers and drum being grooved to receive the wires so that their upper surfaces rest flush with the surface of said rollers and drum. The wires 21 and 27 of the drapers 25 and 27 extend between each other at their meeting ends, over and between the rollers 7 and 8, thus bringing the meeting ends of the upper reaches of the two drapers flush with each other and providing a continuous flat upper draper surface between the roller 5 and drum 11. Sprockets 31, 32, 33, 34, 35 and 36 are respectively fixed to the rollers 4, 5, 6, 7, 8 and drum shaft 10 over which sprockets a chain 40 travels. A clutch 45 is mounted on the drum shaft 10 for clutching the drum 11 to the shaft 10 so that when the drum is rotated the drapers 25 and 30 will be rotated synchronously in the same direction through the medium of chain 40 and its engaging sprockets. Intermeshing gears 46 and 47 are respectively fixed to the rollers 5 and 3, whereby the draper 19 is driven by and synchronously with the draper 25. Intermeshing gears 50 and 51 are fixed to the drum shafts 10 and 13 respectively whereby the drum 12 is rotated synchronously with the drum shaft 10. A roller 52 is journaled below the drum 11 in brackets 53 secured to the frame 1, and a roller 54 is journaled in the frame 1 over which rollers, and drums 12 and 13 travels a draper guide belt 55, there being sufficient slack in the belt to enable the fruit to be gripped by and between the belt and drum 11, as shown in Fig. 1.

A track 60 is secured on the frame 1 below the drum 11, on which track travels a truck 65. The truck is constructed with a flat body 66 to receive a fruit tray 67. A rack 68 is provided on the upper part of the truck body at one side thereof, which rack is adapted to mesh with gear 50, whereby the truck is moved forwardly on the track 60 when the machine is run. Guide mounts 70 depend from the bottom of the truck body in which the truck axles 71 are mounted so that the truck body may move up and down upon said axles. Wheels 75 are mounted on the ends of the axles 71 and travel on the truck 60. Cams 80 are turnably mounted on the axles 71 and engage the bottom of the truck body, for raising and lowering the truck body and for holding the truck body at the desired elevation with relation to the axles. A rod 81 is pivotally connected to the cams 80 and to the lower end of lever 85 which lever is fulcrumed at 86 to the truck body. By swinging the lever 85 the cams 80 through rods 81, are turned on the axles 71, to raise the truck body on its axles to cause the rack 68 to mesh with gear 50, and to lower the truck body to disengage said rack and gear. A chute 90 is provided to receive the fruit and to deliver the fruit to the drapers 19 and 25. A pulley 100 is fixed to the shaft to which power is applied to run the machine.

The operation of the machine is as follows:—

Power is applied to the pulley 100 and the shaft 10 rotates counter-clockwise. The rotation of said shaft drives the draper 25 in the direction of the arrows (Fig. 1) through the medium of sprockets 36, 34, 32, 31 and 33 and chain 40, and the operation of said draper drives the slatted draper 19 in the direction of the arrows (Fig. 1) through the medium of gears 46 and 47, sprockets 17 and 16 and chain 15. The fruit, which may for example be sliced apricots, is delivered from the chute 90 through the slatted draper 19 and drop toward the inclined reach of the wires 21 of draper 25 over the inclined wall 20. Some of the apricots may drop flat-face upon the incline reach of the draper wires, while others may drop convex-face upon the inclined reach of the draper wires. The apricots which drop flat-face upon the inclined reach of the draper 25 are engaged by the slats 18 of the lower reach of the slatted draper 19 and thereby prevented from sliding downward off the inclined reach of said draper. The apricots which drop convex-face upon the inclined reach of the draper 25 roll downwardly on said convex faces on said inclined draper reach, and some of them roll over the slats 18 of the lower reach of the slatted draper 19, until their flat faces rest upon the inclined reach of draper 25, whereupon said slats engage said apricots and prevent them from sliding downward off the inclined reach of the draper 25. The slats 18 of the lower upwardly moving reach of the draper 19, engaging the apricots on the inclined reach of the draper 25, and the wires 21 of said draper, carry the apricots up the inclined reach of draper 25 over the roller 5 to the top of said draper. Said draper then carries the fruit forward over the roller 8 and delivers them on to the wires of the draper 30 just beyond the roller 8. The clutch 45 is thrown into and out of operation to drive the draper 30 intermittently to distribute and spread said fruit evenly over the draper and carry said fruit to the tray 67 on truck 65. The fruit on the draper 30 when it passes between the drums 11 and 12 is engaged by the guide belt 65 and gripped by and between said belt and drum 11 and carried around the drum and delivered from the drum and belt over the roller 52, convex face downward into the tray 67 on the truck 65. The truck is first placed with its right end just beyond the roller 52 and to the right thereof so that the first fruit delivered from the drum 11 and belt 55 will drop into the right end of the tray 67. The lever 85 is swung and the cams 80 turned by the rods 81, whereupon the cams elevate the truck body 66 until the rack 68 meshes with gear 50. As the draper 30 is driven, the gear 50 meshing with rack 68 moves the truck to the right and the fruit is delivered from the drum 11 and belt 65 progressively into the tray 66 convex side downward, from the right to the left end of the tray and is evenly distributed and spread upon the surface of the tray. When the left end of the truck is brought under the drum 11 and the tray spread full of fruit, the clutch 45 is thrown out of operation and the draper 30 stopped; the cams 70 are swung down by the lever 85 through rod 81 and the truck body 65 and rack 68 lowered, disengaging said rack from the gear 50. The truck is moved to the left from under the drum 11 and the tray with the fruit spread thereupon removed from the truck, to be dried. Another empty tray is then placed upon the truck and the above described operations are repeated.

Having described my invention I claim as new and desire to secure by Letters Patent:

1. In a machine of the character disclosed, a draper, a second draper intermeshing with said first draper for receiving fruit from said first draper controllable independently of the first mentioned draper; means for receiving the fruit from the second mentioned draper and operable thereby; a truck; a tray on said truck; means whereby said truck is moved along by said draper and means for enabling said second draper to deliver the fruit therefrom to said tray as the truck is moved.

2. In a fruit spreading machine a wire draper; means for moving said draper; a wire draper intermeshing with said first mentioned draper but not moved thereby; means for moving fruit from said first mentioned draper onto said second mentioned draper; means for moving said second mentioned draper independently of said first mentioned draper and means for carrying the fruit away from said last mentioned draper.

3. In a machine of the character disclosed, a draper, a second draper intermeshing with said first draper for receiving the fruit from said first draper controllable independently of the first mentioned draper, a truck, a tray on said truck, means whereby said truck is moved along by said second draper, and means for enabling said second draper to deliver the fruit therefrom to said tray as the truck is moved.

4. In a machine of the character disclosed; a draper for conveying fruit; said draper including an endless belt; a gear rotatable by said draper; a truck; a rack on said truck for meshing with said gear to move said truck; means for moving said rack into and from engagement with the gear; a tray on said truck and means for enabling the draper to deliver the fruit therefrom to said tray as the truck moves.

5. In a machine of the character disclosed, a draper for conveying fruit, a gear rotatable by said draper, a truck including a body mounted to move vertically with relation to the truck, means for moving said rack into and from engagement with the gear axles, means for moving said truck body vertically to cause said rack to mesh with said gear to move the truck and to cause said rack to move out of mesh with said gear, a tray on said truck, and means for enabling the draper to deliver the fruit therefrom to said tray as the truck moves.

6. In a fruit spreading machine, a wire draper; means for moving said draper; a wire draper intermeshing with said first mentioned draper but not moved thereby; means for moving fruit from said first mentioned draper on to said second mentioned draper; means for moving said second mentioned draper independently of said first draper and means operated synchronously by said second mentioned draper for removing the fruit away from said last mentioned draper.

In testimony whereof I have hereunto set my hand at San Francisco, California, this 8th day of June, 1917.

FRANK L. EMERSON.

In presence of—
  A. J. HENRY,
  ALAN FRANKLIN.